United States Patent
Zhu

(10) Patent No.: US 11,568,427 B2
(45) Date of Patent: Jan. 31, 2023

(54) METHOD AND SYSTEM FOR RANKING PRODUCTS IN AN ELECTRONIC COMMERCE ENVIRONMENT BASED ON SIMILARITY PROPAGATION

(71) Applicant: Affirm, Inc., San Francisco, CA (US)

(72) Inventor: Qi (Nick) Zhu, Toronto (CA)

(73) Assignee: Affirm, Inc., San Francisco, CA (US)

( * ) Notice: Subject to any disclaimer, the term of this patent is extended or adjusted under 35 U.S.C. 154(b) by 37 days.

(21) Appl. No.: 16/103,271

(22) Filed: Aug. 14, 2018

(65) Prior Publication Data
US 2019/0057402 A1    Feb. 21, 2019

Related U.S. Application Data

(60) Provisional application No. 62/546,606, filed on Aug. 17, 2017.

(51) Int. Cl.
*G06Q 30/00* (2012.01)
*G06Q 30/02* (2012.01)
*G06F 16/2457* (2019.01)

(52) U.S. Cl.
CPC ... *G06Q 30/0201* (2013.01); *G06F 16/24578* (2019.01); *G06Q 30/0203* (2013.01)

(58) Field of Classification Search
CPC ............ G06Q 30/0201; G06Q 30/0203; G06F 16/24578; G06F 17/3053
See application file for complete search history.

(56) References Cited

U.S. PATENT DOCUMENTS

| | | | |
|---|---|---|---|
| 8,352,494 B1* | 1/2013 | Badoiu | G06F 16/24554 707/780 |
| 9,361,624 B2* | 6/2016 | Spears | G06Q 30/02 |
| 2008/0270326 A1* | 10/2008 | Musgrove | G06Q 30/0282 705/400 |
| 2014/0067596 A1* | 3/2014 | McGovern | G06Q 30/02 705/26.7 |
| 2017/0161618 A1* | 6/2017 | Swaminathan | G06F 16/23 |
| 2017/0213072 A1* | 7/2017 | Li | G06Q 30/0276 |

FOREIGN PATENT DOCUMENTS

AU      2012275227 B2 * 10/2015 ............ G06Q 30/06

OTHER PUBLICATIONS

Leskovec et al., The Dynamics of Viral Marketing, ACM Transactions on the Web, 2007, https://arxiv.org/pdf/physics/0509039.pdf%20(2.pdf (Year: 2007).*

Canadian Intellectual Property Office as International Searching Authority, International Search Report for PCT/CA2018/050984, dated Oct. 24, 2018.

Canadian Intellectual Property Office as International Searching Authority, Written Opinion for PCT/CA2018/050984, dated Oct. 24, 2018.

\* cited by examiner

*Primary Examiner* — Patricia H Munson
*Assistant Examiner* — Uche Byrd
(74) *Attorney, Agent, or Firm* — Burr & Forman, LLP

(57) ABSTRACT

A method and system for ranking products using similarity propagation. The method incudes calculating a total score of a product based on its own score and a propagated score. The propagated score is determined by looking at a similarity distance value and then applying a similarity distance factor to a product's score to determine a propagated score for a new product.

16 Claims, 5 Drawing Sheets

METHOD AND SYSTEM FOR RANKING PRODUCTS IN AN ELECTRONIC COMMERCE ENVIRONMENT BASED ON SIMILARITY PROPAGATION

CROSS-REFERENCE TO RELATED APPLICATIONS

This application claims the benefit of priority of U.S. Provisional Patent Application No. 62/546,606 filed Aug. 17, 2017 which is hereby incorporated by reference.

FIELD OF THE DISCLOSURE

The disclosure is directed generally at electronic commerce (e-commerce), and more specifically, at ranking products in an electronic commerce environment.

BACKGROUND OF THE DISCLOSURE

Electronic commerce (e-commerce) has been a growing field for many years. Many retailers now offer both a store front location and the ability for customers to purchase items online. In some cases, retailers may only have an online presence. Instead of heading to a retail store, customers can either stay at home to make purchases or can purchase on their mobile devices without having to visit a retail store.

With the creation of e-commerce websites, customers are now also able to check prices of identical products at different merchants on their mobile devices. In some scenarios, the user relies on the website to provide suggestions based on pre-determined criteria. As such, the website must rank products for the user to browse. While different ranking processes are contemplated, many are based on individual criteria such as a product's popularity or price. Newer ranking methodologies are currently being developed in order to improve these search results. As the e-commerce market continues to grow, new innovation continues to be developed to assist the e-commerce market.

Therefore, there is provided a novel method and system for ranking products in an e-e-commerce environment based on similarity propagation.

SUMMARY OF THE DISCLOSURE

The disclosure is directed at a method and system for ranking products in an electronic commerce environment based on similarity propagation.

In one aspect, there is provided a system that includes a processing system for storing a set of modules for performing a ranking of products in an electronic commerce environment. By using criteria such as, but not limited to, user engagement, merchant authority, reviews and ratings and how many merchants are selling the product, a ranking of the products in an electronic commerce environment can be performed. The ranking may represent popularity of a product, the ubiquitousness of the product or the performance of the product versus similar products. This ranking can then be used by consumers help them understand which products to purchase based on a wide variety of criteria.

In another aspect of the disclosure, there is provided a method of ranking products. In the current disclosure, one of the ranking criteria is preferably the number of merchants that sell the product. The availability of the products may represent how popular the product is within the marketplace or provide a ranking criteria reflective of how the product is viewed.

In another aspect, the ranking criteria may also include user engagement with the product, ratings and reviews of the product and merchant authority.

In another aspect, machine learning, such as in the form of neural networks or deep learning networks may be used to assist in the ranking process.

In one aspect of the disclosure, there is provided a method of ranking products in an electronic commerce environment including calculating an own score for each product; calculating a propagated score for each product; calculating a total score for each product; and ranking the products based on the total scores.

In another aspect, calculating a propagated score includes selecting one of the products; determining which of the other products are similar to the selected product; determining a similarity distance between the selected product and the other similar products; and determining the propagated scored based on the similarity distance and the own score of the other similar products. In a further aspect, determining the propagated score includes dividing the own score of the other similar products by the similarity distance between the selected product and the other similar products to generate a product propagated score; and adding all of the product propagated scores to determine the propagated score for the selected product. In yet another aspect, the method further includes calculating a total score for multiple categories of characteristics.

In another aspect, a weighting value or weighting values is/are applied to each of the categories of characteristics. In another aspect, calculating an own score includes generating an own scored based on ranking criteria values. In another aspect, the ranking criteria values are weighted. In yet another aspect, determining the similarity distance comprises using a Jaccard index.

In another aspect of the disclosure, there is provided a system for ranking products in an electronic commerce environment a ranking module including computer executable instructions for selecting one of the products; determining which of the other products are similar to the selected product; determining a similarity distance between the selected product and the other similar products; and determining the propagated scored based on the similarity distance and the own score of the other similar products.

In another aspect, the system further includes a communication module for communicating with a user via a user mobile communication device. In yet another aspect, the system further includes a display module for displaying information to a user via a user mobile communication device.

DESCRIPTION OF THE DRAWINGS

Embodiments of the present disclosure will now be described, by way of example only, with reference to the attached Figures.

DETAILED DESCRIPTION OF THE EMBODIMENTS

Figure 1:
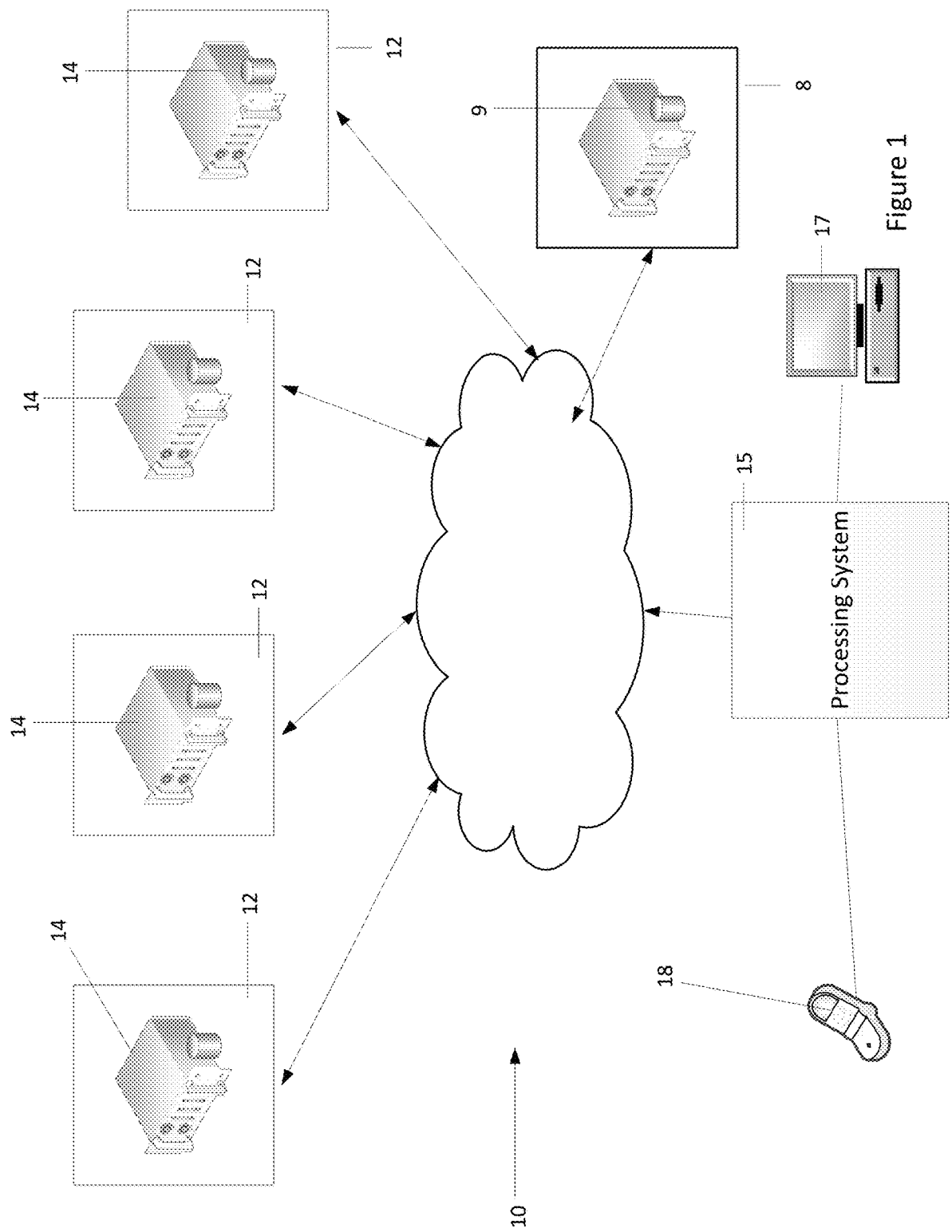
FIG. 1 is a schematic diagram of a system for ranking products in an electronic commerce environment.

The disclosure is directed at a method and system for ranking products in an electronic commerce (e-commerce) environment. By ranking products, a consumer of the product may be able to obtain a better idea as to how a product ranks with respect to similar products. For instance, if the product is a television, a consumer may be able to see how a Sony® 50-inch plasma TV ranks with respect to a Sony® 48-inch plasma TV, Sony® 4D TV, a Panasonic 50-inch plasma TV or a Samsung 55-inch curved TV based on different criteria.

In typical ranking systems and methods, the ranking is based on a total score that is assigned to a product based on different ranking criteria. The ranking criteria may also be weighted to provide certain predetermined criteria with a stronger influence on the total score (and therefore, the overall ranking). In some cases, products may not have any value for a specific ranking criteria. For instance, a new product on the market may not have any ratings or reviews by consumers and the like. As such, when the ranking is being performed, the product's ratings/reviews section would be zero which would cause the product to be unfairly ranked lower. Therefore, it would be beneficial to determine an expected or estimated value for this criteria so that it is not unfairly ranked. In one embodiment, this may be performed based on similarity propagation. In other words, by determine how similar the new product is with existing product or products, an estimated value for the ranking criteria, such as ratings and reviews, can be determined.

Although many different ranking criteria and weightings can be selected, in one embodiment, the ranking criteria can include, but is not limited to, at least one of: number of merchants selling the product, user engagement with the product, merchant authority or ratings and/or reviews of the product. With respect to the number of merchants that are selling the product, by providing a system that is robust and includes or polls a large number of merchants, a product's popularity with merchants can provide an indication with respect to the how highly a product should be ranked. With respect to user engagement, by reviewing how many times a consumer has viewed a website associated with a product or made it a favorite, an understanding of the products popularity with consumers can be determined. In some cases, other types of user engagement with a product, or a website associated with a product, can be tagged for use in the ranking or total score determination. In one embodiment, the user engagement relates to social media interactions with online postings regarding the product or products.

With respect to merchant authority, as many different merchants sell different versions of products, the information from certain merchants may be provided a higher weighting for the ranking process if the merchant is deemed a merchant authority. For instance, in electronics, certain specialized merchants are recognized as being experts in electronics while other general merchants carry lower end versions of electronics as they tend to be a one-stop shop offering a wide variety of products. Therefore, in the field of electronics, the specialized merchants may be seen as being more of an authority on electronics and therefore, their numbers (when used as ranking criteria) may be given more weight than general merchants.

Turning to FIG. 1, a system for ranking products in an electronic commerce environment is shown. The system 10 includes a processing system or memory component 15 that communicates with a plurality of servers 12, with each server 12 representing a merchant 14 that sells products. In the current example, the products are televisions (TVs) and the merchants are stores that sell electronics (including televisions). However, the products may be any product that is typically sold within an electronic commerce (e-commerce) environment and the merchants may be any merchant that sells that type of product. The processing system 15 may also communicate with other servers 8 (related to non-merchants 9) that collect or store information or data that can be used in the ranking process. For example, the server 8 may include product rankings by other entities, product recalls, sales and the like. In one embodiment, the servers 8 or 12 may include reviews of the product, the number of times the product has been purchased, the rating of the product as provided by reviewers or consumers, whether or not a merchant sells a certain product etc.

Communication between the processing system 15 and the servers 12 or 8 is preferably performed using a wireless communication protocol, such as via the Internet 16. A user can access the processing system 15 via a mobile communication device 18 or mobile device, such as a smartphone or a tablet. Alternatively, the user can access the processing system 15 via any other known methods, such as a desktop computer 17 or a laptop and the like. Some or all of the information that is retrieved by the processing system 15 may be used for the ranking process, as will be described in more detail below.

Figure 2:
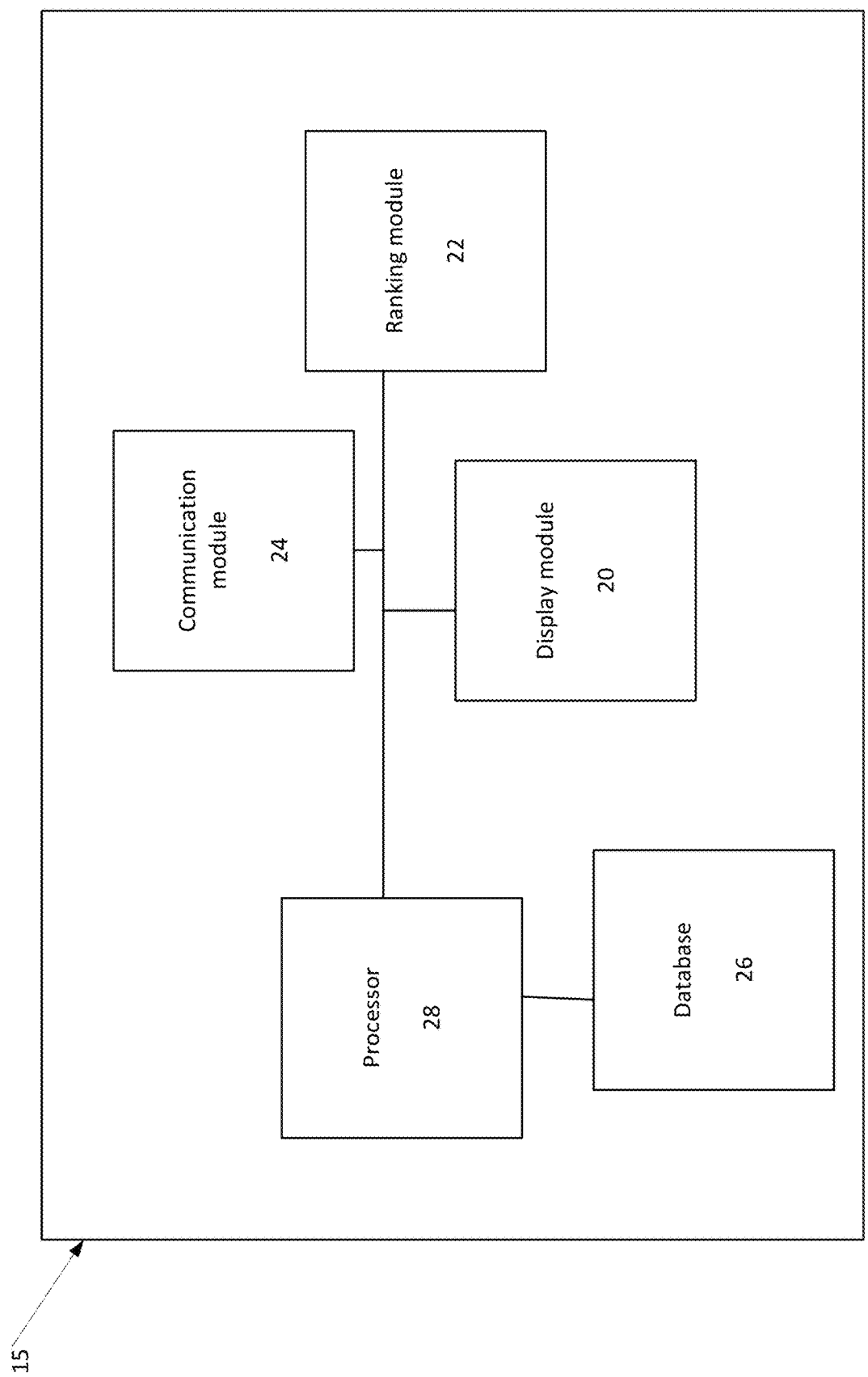
FIG. 2 is a schematic diagram of a processing system for use in ranking products in an electronic commerce environment.

Turning to FIG. 2, a schematic diagram of the processing system 15 is shown. Within the processing system 15 are a set of modules for performing the ranking of products in an electronic commerce environment. The processing system 15 may include a display module 20, a ranking module 22, a communication module 24 and a database 26 for storing the results from the ranking module 22 and a processor 28.

The display module 20 is used to communicate with the mobile device 18 (or device with which the consumer is communicating with the processing system 15 to display information to the user or consumer. This information may be in the form of a listing showing a ranking of the products such that a user, or consumer, can make a more informed decision when purchasing a product. The ranking that is shown to a user is preferably generated via a similarity propagation ranking methodology. Communication between the mobile device 18 and the processing system 15 may also be performed by the communication module 20 with the display module 20 providing the graphical user interface (GUI) or information to be displayed on the device 18. The communication module 20 may also communicate with the different servers 12 to retrieve product information and the servers 8 to retrieve other information that may be used as part of the ranking approach of the disclosure. The retrieval of the product information may be performed when requested by a user via the mobile device 18. Alternatively, the ranking may be previously performed and stored in the database 26 and then retrieved by the processor 28 when requested by a user via the mobile device 18. In this manner, the user does not have to wait for a ranking to be completed but can be provide with results in a more timely manner. The ranking module 18 performs a ranking of the products based on the retrieved information. In one embodiment, the ranking may be performed with a weighting assigned to each of the criteria such that a more accurate ranking may be achieved. In another embodiment, the ranking is performed with similarity propagation to estimate values to be used in the ranking process when no information is available. The results of the ranking may then be stored in the database 26.

Figure 3:
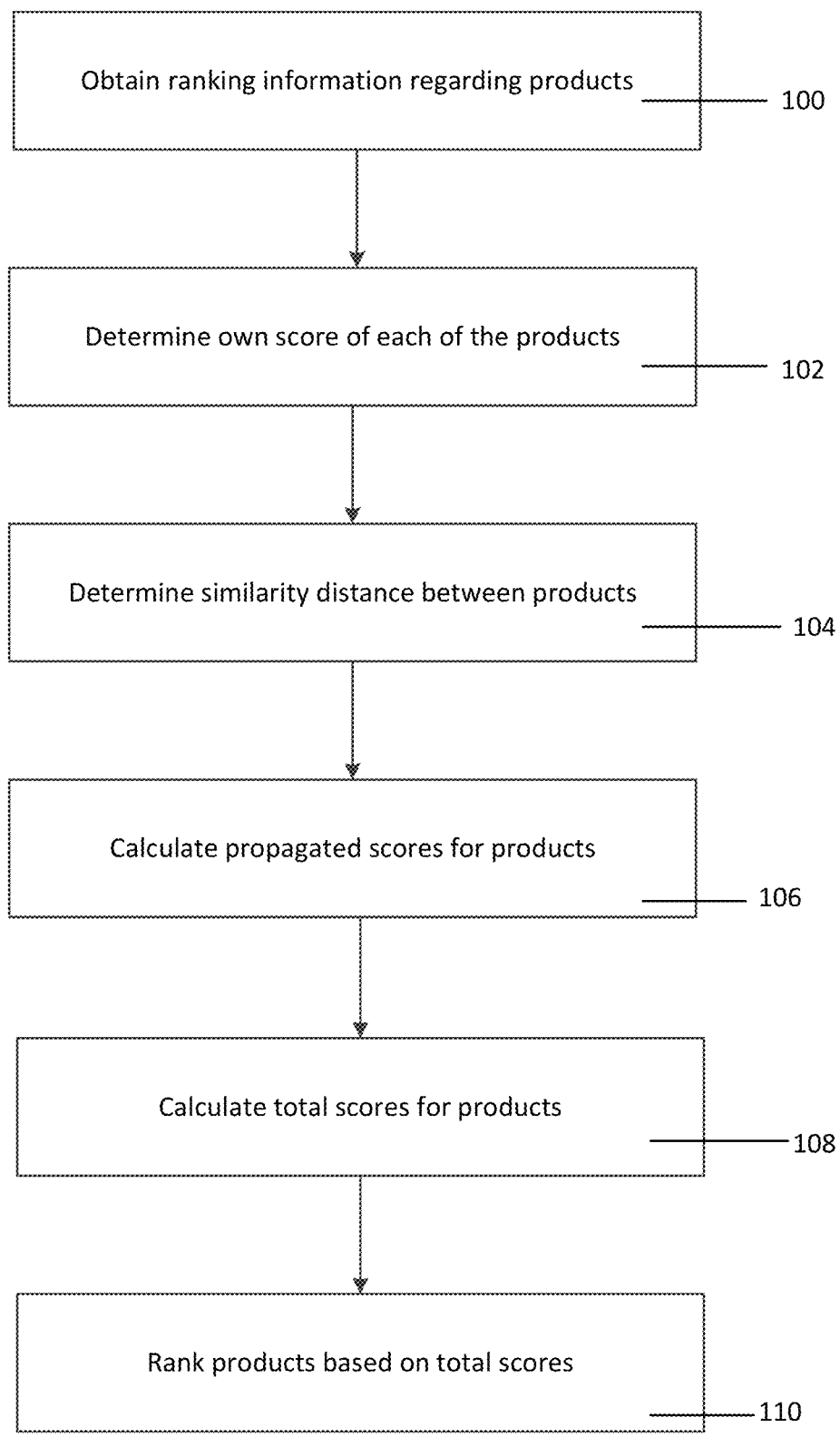
FIG. 3 is a flowchart outlining a method of ranking products in an electronic commerce environment.

Turning to FIG. 3, a flowchart outlining a method of ranking products in an electronic commerce environment is shown. Based on a request from a user, or as part of a predetermined process or procedure, ranking information relating to the products is obtained 100. In one embodiment, the processing system 15 retrieves ranking information from the various servers 8 and/or 12. This ranking information may be obtained based on different criteria, such as, but not limited to, user engagement, ratings, reviews, merchant authority or the number of merchants selling the product. Any combination of these or other criteria may be used for the ranking.

The user engagement criteria may include how many times a user has selected the product as a favorite, or has clicked on links associated with the product to view the product or purchased the product. This information can be retrieved from the servers 8 or 12 or may be stored in the processing system 15. User interaction with websites associated with processing system 15 that display the product may also be obtained. The user engagement information may also be retrieved from polling different information sources over the Internet or may be retrieved from the database that stores this user engagement information based on how other users have interacted with the product within an application. Other user engagement information may be contemplated. The ratings and review information relate to information users or customers may have posted with respect to the products. This ranking and review information may be retrieved or polled from other sources such as online websites, blogs, merchant websites, data streams or may be manually entered by an individual who has access to rating and review information.

The merchant authority criteria relates to the purchasing and selling power of different merchants. For instance, with respect to some products, such as electronics, a merchant such as BestBuy® could be seen as more of an authority on electronics than Walmart® (which also sells electronics). As such, the information provided by BestBuy® with respect to an electronic product may be given more weight in the ranking system than information provided by Walmart®. In one embodiment, the information relating to the number of merchants selling the product may be retrieved by polling merchants and setting a counter each time a merchant is determined to be selling the product. This may be on a merchant by merchant basis or may be determined based on a franchise merchant and the number of storefronts that are associated with the franchise merchant. Alternatively, the information can be retrieved by analyzing a list of top selling products of a merchant, past transactions or be assigned by an expert.

Once the information has been obtained, for each of the products, their own score is calculated 102. This calculation may be performed based on a predetermined algorithm. The algorithm may include weightings where some ranking criteria are deemed more significant than other criteria, such as disclosed above. The products may then be ranked based solely on their own ranking criteria. After each product's own score is determine, the similarity distance between two products is calculated 104. This may be performed using a comparing methodology, such as, but not limited to, Jaccard, SSIM or an n-dimensional space mapping. In an alternative, a clustering methodology such as disclosed in US Provisional Application No. 62/546,599 filed Aug. 17, 2017 (which is hereby incorporated by reference) may be used.

The similarity distance may result in a set of locality sensitive hash values. Once the similarity distance has been determined, there may be no need to re-do the comparison as these values are permanently stored, however, it will be understood, that the comparison may be re-done, if desired. In one embodiment, if a n-dimensional space mapping is used, the number of products that are clustered around a product (or new product) may be selected as being similar to the new product. This may also be enabled using semantic data to compare two products whereby if the similarity value is less than a threshold, the products are linked or seen as being similar and if the similarly value is greater than a threshold value, the products are deemed to not be similar.

Figure 4:
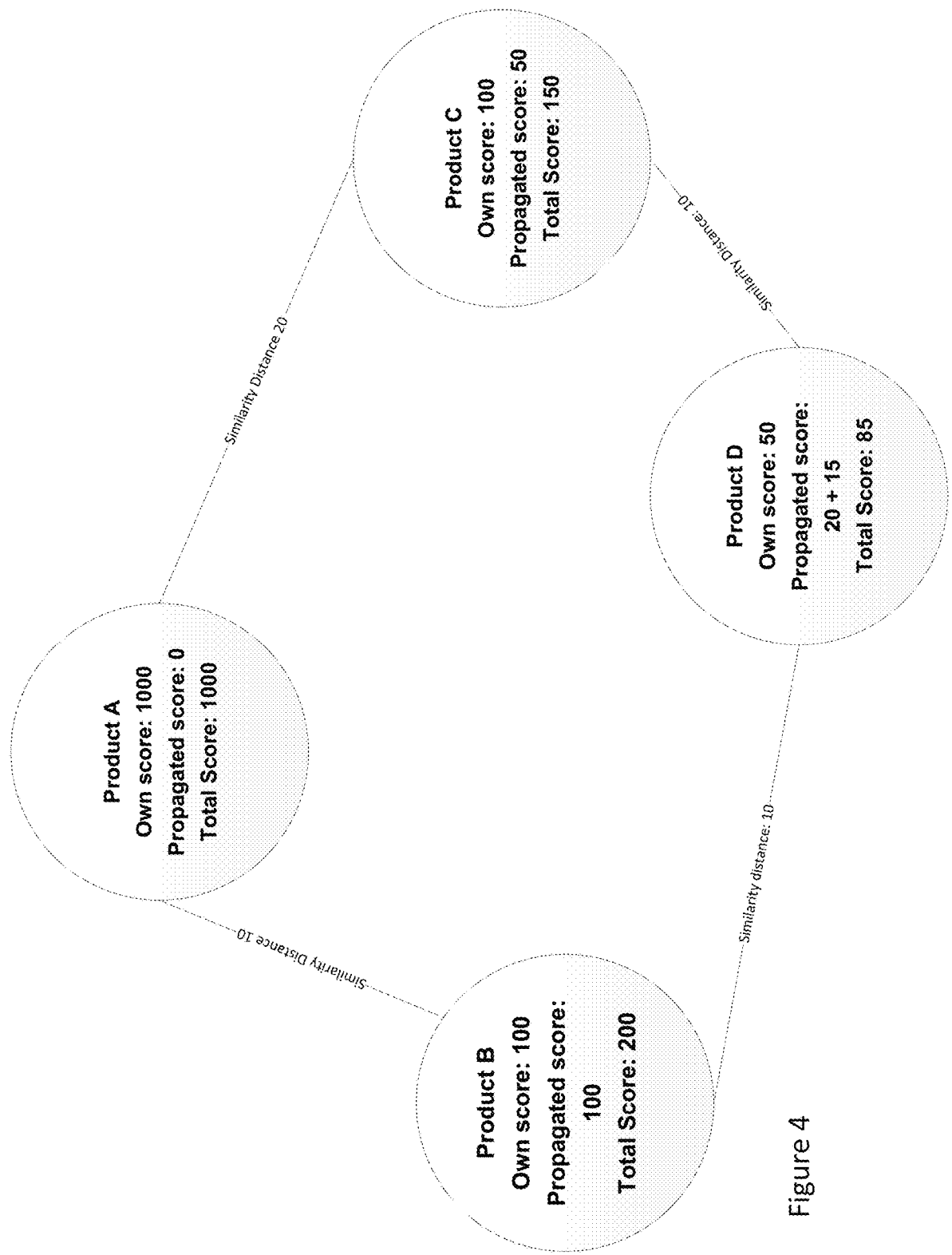
FIG. 4 is a schematic diagram showing how ranking may be performed.

The propagated scores for the products can then be calculated 106. One embodiment of how a propagated score can be determined is schematically shown in FIG. 4. However, other methods of determining of estimating a propagated score are contemplated. In the current embodiment, the total score of the higher ranked product is divided by the similarity distance value to determine the propagated score for the lower ranked product. As seen in FIG. 4, the propagated score for Product B is calculated by dividing Product A's total score of 1000 by the similarity distance of 10 to produce a propagated score of 100 for Product B. For Product C, the propagated score is calculated by dividing Product A's total score of 1000 by the similarity distance of 20 to produce a propagated score of 50 for Product C. For Product D, the propagated score is calculated by dividing Product B's total score of 200 by the similarity distance of 10 and Product C's total score of 150 by the similarity distance of 10 to produce a propagated score of 20+15 or 35. Although not show, Product A may also receive a propagated score from Product D (or vice-versa).

The total scores for each of the products can then be calculated 108. In the example of FIG. 4, the total score for Product A is 1000, for Product B is 200, for Product C is 150 and for Product D is 85. If desired, the products can then be ranked or re-ranked based on the calculated total scores 110. This is described in more detail below.

In this embodiment, the propagated score is calculated based on a total score of products, however, in other embodiments, the propagated score of specific criteria may be estimated and then included in determining the total score of the product such as for new products.

For example, assume that ranking information included four criteria such as customer response, number of merchants selling the product, price and size, each evaluated out of 10. For a new product, their customer response value may be zero. In order to generate a value for customer response for use in calculating their total score, the customer response scores of similar products may be obtained and then, by using similarity propagation, an estimated customer response value can be determined and then used in the determination of the total score for the product. This is preferably performed using the similarity propagation methodology of the disclosure.

As will be understood, the scores may be regularly updated or re-generated based on a predetermined time period or whenever it is requested by a user.

Figure 5:
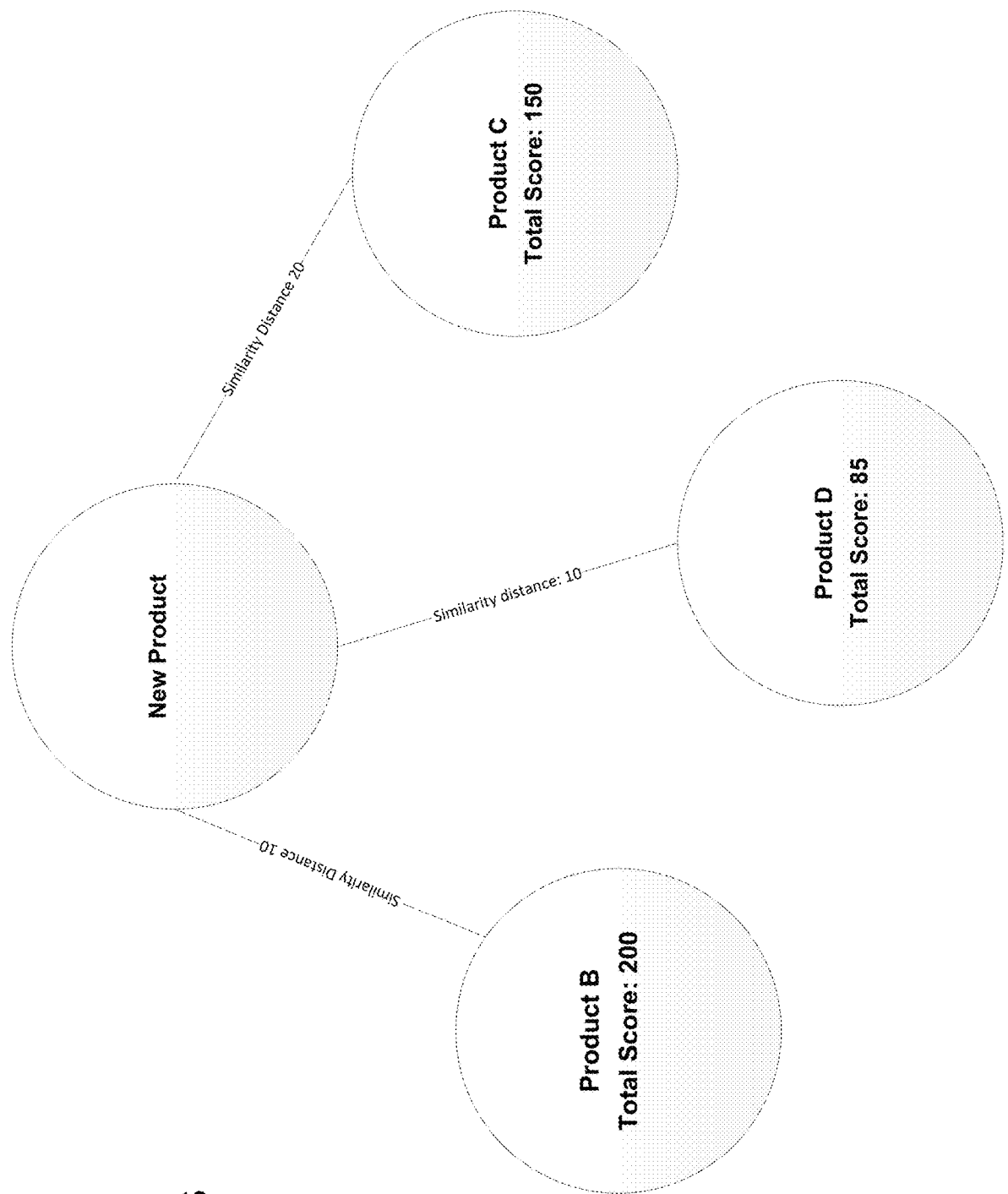
FIG. 5 is a schematic diagram of applying a score to a new product.

Turning to FIG. 5, a schematic diagram of how to determine a score for a new product is shown. In FIG. 5, it can be seen that the new product is connected to three (3) other products. As will be understood, the new product is likely to be connected to any number of other product but 3 are shown in the Figure for ease of understanding.

Assuming that the new product has no score with respect to customer ranking, the similarity of the new product with Product B, Product C and Product D and the customer ranking scores of these products may be used to provide an estimated customer ranking score. In other words, assuming the new product is a 55-inch TV, the customer rankings of the 50-inch TV of Product B, the 55-inch TV by a competing manufacturer of Product C and the 55-inch TV using different technology of Product D can be used to determine a propagated score for the new product (such as using the method described above). As there are no customer rankings, the own score of the new product can initially be seen as zero until customer rankings/reviews are submitted whereby the ranking process is re-performed when own scores are changed.

In the current example, the total score for the new product (which is the propagated score) is 36 (200/10+150/20+85/10).

As can be seen, the system and method of the disclosure enables new products to be ranked for display without needing to penalize the product for being new. By using similarity propagation, the new products may be provided an estimated score for certain criteria to assist in providing a more robust and accurate ranking.

In a preferred embodiment, the criteria that is used in the ranking process are also provided weighting values in order to generate a more accurate ranking. For instance, the number of merchants may be given a weighting of 0.5 while user engagement may be given a weighting of 0.25 and merchant authority is given a weighting of 0.25 whereby the number of merchants selling a product is given a higher influence on the overall ranking. Alternatively, the weightings may be changed such that another one of the criteria is given a higher influence in the overall ranking.

In some embodiments, the determination of propagated scores may be performed with machine learning modules such that products that do not have a value for at least one of the ranking criteria are not negatively affected such as by a lack of ratings and reviews if this is one of the ranking criteria. In one embodiment, machine learning may be used to assist in developing conditional weighting criteria for the ranking process whereby the ratings and reviews information may be assigned a lesser weight for new products and assigned a higher weight for products that have been on the market for longer as determined by a developer of the system. In another embodiment, the machine learning apparatus determines propagated scores based on similarity propagation as outlined above. In another embodiment, by taking advantage of current machine learning capabilities, an approximate value for the contribution of the ratings and reviews for a new product (or other ranking criteria) may be generated and used for the ranking process.

In another example, with new products, there may not be any ratings and reviews and if that is one of the ranking criteria, the new product may be unfairly penalized in the rankings through no fault of their own. By using machine learning to learn how closely related ratings and reviews may be with respect to other ranking criteria, the system may be able to provide a representative ranking and review value for the ranking process such that the new product may then be provided a machine learning assisted ranking. As the product obtains new ratings and reviews, the ranking may be updated to reflect truer ranking values.

Turning to FIG. 4, a schematic diagram of another embodiment of a ranking system in accordance with the disclosure is shown. The current embodiment finds benefit in a ranking system that is preferably used in conjunction with machine learning and can be seen as a ranking system that includes influence from similar products. In the current embodiment, there are four products listed, namely Product A, Product B, Product C, and Product D. Each product has its own score, a propagated score and a total score.

The own score can be seen as a value that the product is assigned based on its own ranking criteria values. The propagated score can be seen as a value that the product is assigned based on its similarity to other similar products based on the scores of the similar products. The total score can be seen as a sum of a product's own score and the product's propagated score.

In the current example, Product A has an own score of 1000 and a propagated score of 0 for a total score of 1000, Product B has an own score of 100 and a propagated score of 100 for a total score of 200, Product C has an own score of 100 and a propagated score of 50 for a total score of 150 while Product D has an own score of 50 and a propagated score of 35 for a total score of 85.

As can be seen, based on its own score, Product A is ranked highest with products B and C tied and then Product D having the lowest original score. However, based on its similarity with Product A, Products B, C and D may have their scores adjusted/boosted such that their total score is improved (which may result in a higher ranking in the overall ranking procedure). Determining the similarity of products may be performed by clustering products together. Determining the similarity of products, such as based on a comparison methodology may be performed to determine the similarity distance between products. The comparison methodology may be based on Jaccard, SSIM or an n-dimensional mapping space. As will be understood, the inverse propagated score is only one way to calculated a propagated score. In an alternative embodiment, data binning can be used. For a distance within a certain range, a fixed amount of propagation can be provided. For example, a distance from 0-10 triggers 50% propagation while 10-20 triggers 25% propagation and so forth.

In some cases, the generation of a propagated score may be used to provide a ratings and reviews value for a new product (such as discussed above).

In some embodiments, machine learning may be used to provide values for ranking criteria based on its learnings.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

What is claimed is:

1. A method of ranking products in a set of products in an electronic commerce environment comprising:
   receiving a list comprising the set of products;
   calculating an own score for each product using non-historical product attributes that include a customer ranking score of each product via a computing device;
   calculating, via a machine learning apparatus embodied at the computing device, a propagated score for each product via the computing device;
   calculating a total score for each product, via the computing device, based on the own score for each product and the propagated score for each product;
   ranking the products, via the machine learning apparatus to develop conditional weighting criteria to assign a weighting factor to components of the total score for each product at the computing device, based on the weighting factors assigned to the total scores for each product based on predetermined criteria; and
   displaying all or part of the set of products from the list in an order determined based on the ranking,
   wherein the set of products includes a new product and wherein calculating a propagated score for each product includes estimating the customer ranking score for the new product,
   wherein calculating a propagated score comprises determining a similarity distance between a selected product and a set of other similar products,
   wherein determining the similarity distance comprises comparing the selected product and the set of other similar products via n-dimensional space mapping, and
   wherein determining the similarity distance comprises comparing the selected product and the set of other similar products via a selected one of clustering, Jaccard index, or n-dimensional space mapping.

2. The method of claim 1 wherein calculating a propagated score comprises:
   selecting the selected product from the set of products;
   determining which other products in the set of products are similar to the selected product to generate the set of other similar products; and
   determining the propagated score based on the similarity distance and an own score of each of the set of other similar products.

3. A method of ranking products in a set of products in an electronic commerce environment comprising:
   receiving a list comprising the set of products;
   calculating an own score for each product using non-historical product attributes that include a customer ranking score of each product via a computing device;
   calculating, via a machine learning apparatus embodied at the computing device, a propagated score for each product via the computing device;
   calculating a total score for each product, via the computing device, based on the own score for each product and the propagated score for each product;
   ranking the products, via the machine learning apparatus to develop conditional weighting criteria to assign a weighting factor to components of the total score for each product at the computing device, based on the weighting factors assigned to the total scores for each product based on predetermined criteria; and
   displaying all or part of the set of products from the list in an order determined based on the ranking,
   wherein the set of products includes a new product and wherein calculating a propagated score for each product includes estimating the customer ranking score for the new product,
   wherein calculating the propagated score comprises:
   selecting a product from the set of products;
   determining which other products in the set of products are similar to the selected product to generate a set of other similar products;
   determining a similarity distance between the selected product and the set of other similar products; and
   determining the propagated score based on the similarity distance and an own score of each of the set of other similar products, and
   wherein determining the propagated score comprises:
   dividing the own score of each of the set of other similar products by the similarity distance between the selected product and the other similar products to generate a product propagated score for each of the set of products; and
   adding the product propagated scores of each of the set of products to determine the propagated score for the selected product.

4. The method of claim 3 further comprising:
   calculating a total score for multiple categories of non-historical product attributes.

5. The method of claim 4 further comprising:
   applying weighting value to each of the categories of non-historical product attributes.

6. The method of claim 3 wherein calculating an own score comprises:
   generating an own score based on ranking criteria values.

7. The method of claim 6 wherein the ranking criteria values are weighted.

8. The method of claim 2 wherein determining the similarity distance comprises using a Jaccard index.

9. A system for ranking products within a set of products in an electronic commerce environment comprising:
   a memory component comprising one or more modules executable by one or more processors, the one or more modules comprising:
   a ranking module for:
   selecting one of the products from the set of products as a selected product;
   determining which other products in the set of products are similar to the selected product to determine a set of other similar products based on non-historical product attributes;
   determining a similarity distance between the selected product and each of the set of other similar products;
   determining, via a machine learning apparatus, a propagated score based on the similarity distance and an own score of each of the set of other similar products, the own score being calculated based on the non-historical product attributes including a customer ranking score of each product; and ranking the products, via the machine learning apparatus to develop conditional weighting criteria to assign a weighting factor to components of the total score for each product, based on the weighting factors assigned to the total scores for each product based on predetermined criteria, wherein the set of products includes a new product and wherein determining a propagated score includes estimating non-historical product attributes for the new product, and wherein the modules further comprise a display module configured to display all or part of the set of products in a list ordered based on the ranking generated based on a total score that includes the own score and the propagated score, and wherein determining the propagated score comprises:
dividing the own score of each of the set of other similar products by the similarity distance between the selected product and the other similar products to generate a product propagated score for each of the set of products; and adding the product propagated scores of each of the set of products to determine the propagated score for the selected product.

10. The system of claim 9 further comprising:
a communication module for communicating with a user via a user mobile communication device.

11. The system of claim 9 further comprising:
a display module for displaying information to a user via a user mobile communication device.

12. The method of claim 1 wherein the non-historical product attributes comprise user engagement with each product, merchant authority, or number of merchants selling each product.

13. The method of claim 1, wherein the own score and the propagated score are each modified by a corresponding one of the weighting factors, and wherein a weighting factor of the own score increases as a number of customer rankings increases.

14. The system of claim 9, wherein the own score and the propagated score are each modified by a corresponding one of the weighting factors, and
wherein a weighting factor of the own score increases as a number of customer rankings increases.

15. The system of claim 9, wherein determining the similarity distance comprises comparing the selected product and the set of other similar products via n-dimensional space mapping.

16. The system of claim 9, wherein determining the similarity distance comprises comparing the selected product and the set of other similar products via a selected one of clustering, Jaccard index, or n-dimensional space mapping.

\* \* \* \* \*